United States Patent [19]

Goettler et al.

[11] Patent Number: 4,627,472

[45] Date of Patent: Dec. 9, 1986

[54] HOSE REINFORCED WITH DISCONTINUOUS FIBERS ORIENTED IN THE RADIAL DIRECTION

[75] Inventors: Lloyd A. Goettler; Arthur J. Lambright, both of Akron, Ohio

[73] Assignee: Monsanton Company, St. Louis, Mich.

[21] Appl. No.: 113,143

[22] Filed: Jan. 18, 1980

Related U.S. Application Data

[63] Continuation of Ser. No. 929,486, Jul. 31, 1978, abandoned, which is a continuation of Ser. No. 792,458, Apr. 29, 1977, abandoned.

[51] Int. Cl.$^4$ .............................................. F16L 11/08
[52] U.S. Cl. .................................... 138/174; 138/177; 138/178; 264/108; 428/36

[58] Field of Search ............... 138/118, 137, 153, 172, 138/174, 177, 178; 264/108; 428/323, 326, 327, 36, 35

[56] References Cited

U.S. PATENT DOCUMENTS

| | | | |
|---|---|---|---|
| 3,236,928 | 2/1966 | Blume | 264/108 X |
| 3,608,134 | 9/1971 | Cook | 264/108 X |
| 3,651,187 | 3/1972 | Cessna | 138/174 X |
| 3,697,364 | 10/1972 | Boustany et al. | 264/108 X |
| 3,998,681 | 12/1976 | Williams | 264/108 X |

Primary Examiner—James E. Bryant, III
Attorney, Agent, or Firm—Gordon B. Seward

[57] ABSTRACT

A hose comprising extrudable polymer reinforced with discontinuous fibers oriented in the radial direction is described.

1 Claim, 3 Drawing Figures

HOSE REINFORCED WITH DISCONTINUOUS FIBERS ORIENTED IN THE RADIAL DIRECTION

This is a continuation of application Ser. No. 929,486, filed July 31, 1978, now abandoned, which is a continuation of Ser. No. 792,458 filed Apr. 29, 1977, now abandoned.

This invention relates to hose reinforced with discontinuous fibers, particularly to hose reinforced with discontinuous fibers oriented in the radial direction.

BACKGROUND OF THE INVENTION

It is known that forcing a matrix containing discontinuous fibers through a restricted space, by milling or extrusion, orients the fiber in the direction of flow. The alignment of the fibers is similar to the alignment of logs in a moving stream. Thus, extrusion of a matrix containing discontinuous fibers through conventional dies gives a hose in which the fibers are oriented in the axial direction (the direction parallel to the axis of the die). Applicants in their co-pending patent application Ser. No. 428,219 filed Dec. 26, 1973 described a hose reinforced with discontinuous fibers oriented in the circumferential direction which hose is prepared by extruding a polymer matrix containing discontinuous fibers through a die channel having inner and outer surfaces which diverge from the axis of the die to such extent that the ratio of the channel outlet to channel inlet area is two or more.

Hoses with fibers oriented in the axial direction have great longitudinal strength because of the fiber reinforcement in that direction, whereas, hoses with fibers oriented in the circumferential direction can withstand greater internal pressure with less expansion because of the fiber reinforcement around the circumference of the hose. However, in both the aforesaid hoses the fibers are oriented parallel to the surface of the hose and the hoses are essentially free of fiber reinforcement in the radial direction.

SUMMARY OF THE INVENTION

Accordingly, the present invention provides a hose of extrudable polymer reinforced with discontinuous fibers oriented in the radial direction. For a more complete understanding of methods for making the hose of the invention, reference may be made to U.S. Pat. No. 4,057,610, issued Nov. 8, 1977, on application Ser. No. 599,115, parent application to application Ser. No. 929,486, filed July 31, 1978, of which this application is a continuation, the disclosure of which patent is herein incorporated by reference.

The angular placement of the individual fibers throughout the extruded composite constitutes the orientation distribution which determines the directional or anisotropic physical properties of the hose. There is a direct correspondence between the orientation distribution of the fibers and the directional material properties, such as mechanical strength, modulus, or elongation measured under an applied stress or under an internal stress generated by the swelling action of a solvent. The reinforcement anisotropy can be characterized by specifying either the components of the fiber orientation or a corresponding material property for each of the three principal directions in the hose: axial, circumferential and radial.

The term "composite" as used herein means "a mixture of discontinuous reinforcing fibers in a matrix comprising extrudable polymer." The term "channel width" as used herein means the distance between the surface of the mandrel and the surface of the outer die member which forms the channel. The term "components of fiber orientation" means the direction cosines of the fiber axes averaged over the entire population of fibers present in the hose. Fiber orientation may be described by the direction cosines of each fiber axis relative to the x, y and z coordinates, in which x is a coordinate parallel to the axis of the die which passes through one end of the fiber, y is the coordinate tangent to a circle concentric to the axis which passes through the same fiber end, and z is the coordinate perpendicular to the plane defined by x and y. Thus, when the y and z intercepts are zero so that the fiber is lying along the x-axis, the direction cosines $\cos 0_y = \cos 0_z y/l = z/l = 0$ and $\cos 0_x = x/l = 1$, where l is the fiber length. Conversely, when x and y are zero, then z is equal to the fiber length, and the fiber is oriented entirely in the radial direction. Typically, the value for each direction cosine is greater than zero, meaning that the fiber is tilted away from any particular plane. A mean orientation vector (of unit length) can be derived by averaging the direction cosines over the entire population of individual fibers. The fibers can then be said to be oriented in general toward one of the principal directions, or to have a predominant orientation in that direction, if the mean direction cosine for that direction exceeds each of those for the other two directions. The reinforcing effect of the fibers will of course also be highest in the direction of highest direction cosine. The term "highly oriented" as used herein means the situation when the square of the mean direction cosine for any principal direction exceeds a value of 0.5. In other words, the square of the mean direction cosine for any principal direction, by geometrical considerations, exceeds the sum of the squares of the mean direction cosines for the other two directions. The orientation may be conveniently determined by swelling a specimen of composite hose and measuring the amount of swell in each of the principal directions. The amount of swelling in each direction indicates relative fiber orientation. The specimen swells the least in the direction having the largest component of fiber orientation.

A hose of this invention has a smooth surface and is pliable while in a plastic condition, which facilitates bending to form a shaped hose without significant distortion or loss of surface smoothness. A plastic condition means a state in which the hose is soft enough to be shaped yet capable of retaining a fixed shape after being formed. Thermoplastic polymers, including thermoplastic elastomers, are generally in a plastic condition at elevated temperature and harden upon cooling. Thermosetting polymers, including vulcanizable elastomers, re in a plastic condition while being masticated, compounded, extruded and shaped but lose plasticity upon curing. Thus, with vulcanizable elastomers, a hose is extruded, bent to the desired shape and cured, whereas, with the thermoplastic elastomers, a hose is extruded, bent to the desired shape and then cooled.

DETAILED DESCRIPTION

Figure 1:
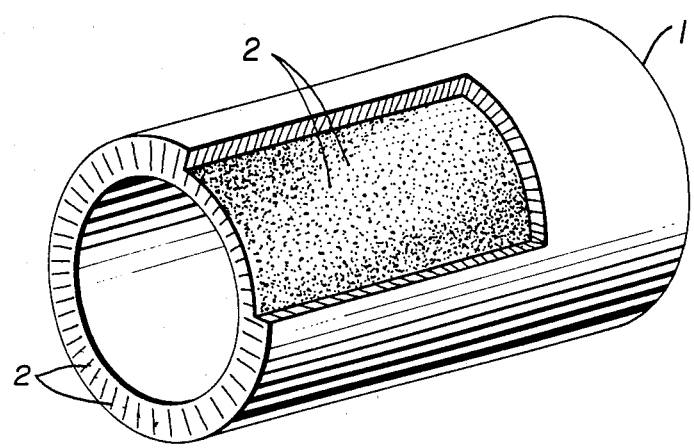
FIG. 1 is a graphic representation of a reinforced hose with a section removed to show the arrangement of discontinuous fibers oriented in the radial direction.

Referring to FIG. 1, hose 1 with a section removed illustrates a hose having fibers 2 oriented in the radial direction. Radial orientation of the fibers is shown in the end cross-section of hose 1 by fibers 2 being aligned so that they point toward the axis of symmetry of the hose. In the portion of hose 1 in which a section is removed, only the ends of fibers 2 (or cross-sections of fibers) are in view.

Figure 2:
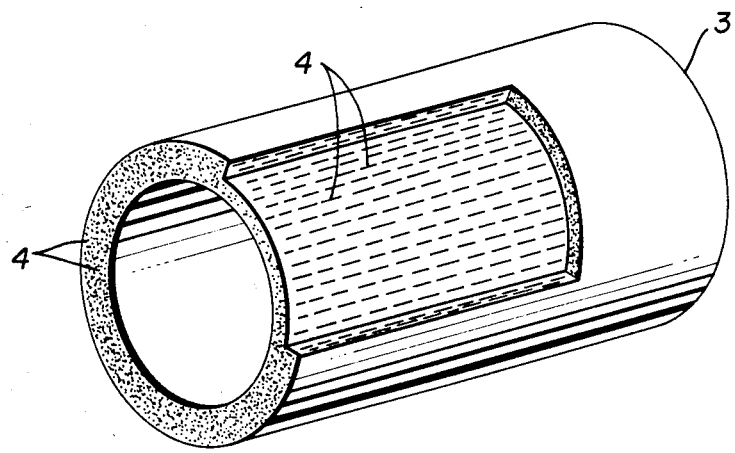
FIG. 2 is a graphic representation of a reinforced hose with a section removed to show the arrangement of discontinuous fibers oriented in the axial direction.

FIG. 2 shows hose 3 having fibers 4 oriented in the axial direction in which the fibers are aligned substantially parallel to the axis of symmetry of the hose. In the end cross-section of hose 3, only the ends of fibers 4 (or cross-sections thereof) are in view, whereas, substantially the entire length of fibers 4 are visible in the portion of hose 3 in which a section is removed.

Figure 3:
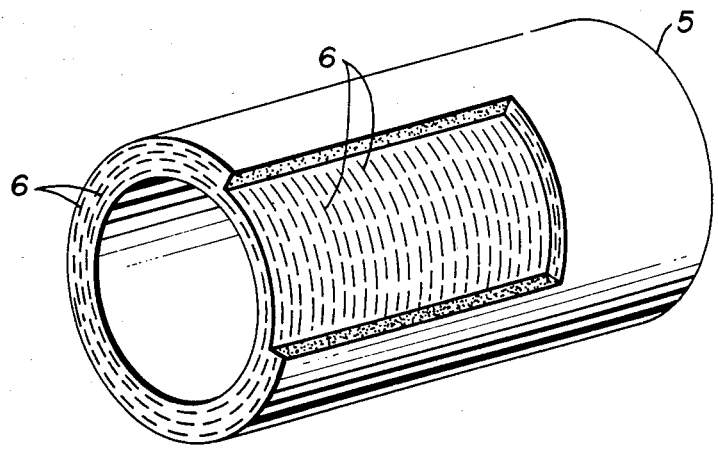
FIG. 3 is a graphic representation of a reinforced hose with a section removed to show the arrangement of discontinuous fibers oriented in the circumferential direction.
Figure 4:
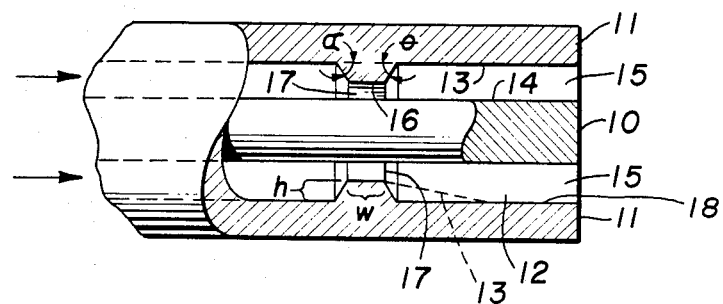
Figure 5:
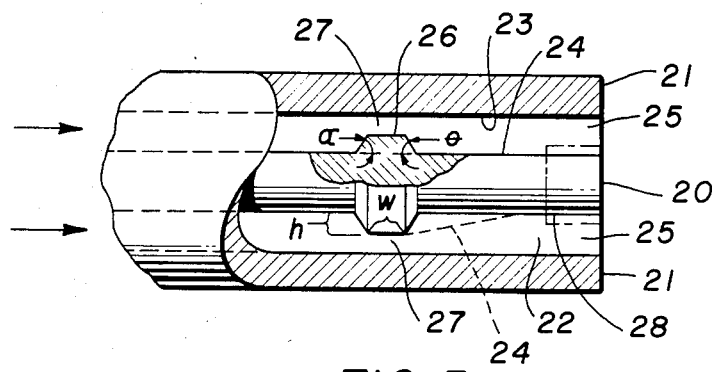
Figure 6:
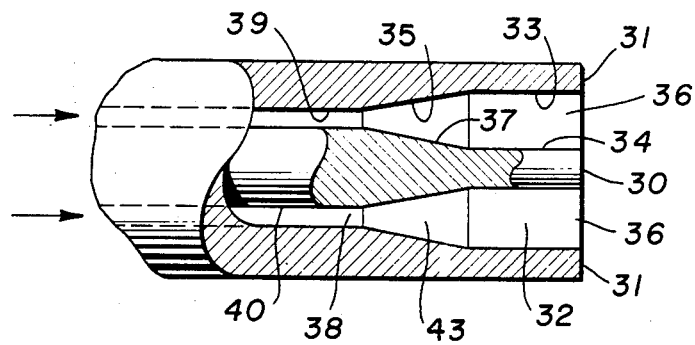

Referring to FIG. 3, hose 5 is shown having fibers 6 oriented in the circumferential (hoop) direction in respect to the axis of the hose. In circumferential orientation, fibers 6 are aligned in the direction of the circumference of the hose, therefore, substantially the entire lengths of fibers 5 are visible in both the end cross-section of hose 5 and in the portion of hose 5 in which a section is removed.

Of course, it is understood that FIGS. 1, 2 and 3 are idealistic representations. Normally, a number of fibers are tilted from any particular plane of orientation and all three orientations, axial, circumferential and radial, co-exist with one type of orientation generally predominating.

Axial orientation as shown in FIG. 2 may be achieved by extruding a matrix containing discontinuous fibers through a die having a channel of equal or diminishing channel width which channel is essentially parallel to the direction of extrusion; however, minor numbers of fiber may still be oriented in the other two planes. Circumferential orientation as shown in FIG. 3 may be achieved by extruding a matrix containing discontinuous fibers through a die having a channel in which both channel walls diverge outwardly from the axis.

Hose with an annular profile is obtained by extruding composite through a die with a circular outlet in which the mandrel is concentric with the outer die member. Hose with a non-symmetrical curvilinear profile is obtained by extruding composite through a die having a non-circular outlet such as an oval or cigar shaped outlet. Hose with non-uniform wall thickness is obtained by extruding composite through a die in which the mandrel or outer die member have different profiles or by extruding composite through a die in which the mandrel is set off-axis. Hose with non-uniform wall thickness are especially useful in preparing pneumatic tire preforms. The hose is cut to the appropriate length, bent to conform to a tire mold with the thickest area at the crown portion of the tire thereby forming the tread. Hose with either symmetrical or non-symmetrical profiles may be split and laid flat to form a sheet which sheet has a proportion of fibers (more or less depending upon the area expansion through the die) oriented perpendicularly to the surface of the sheet. Normally, when making sheet a hose of 30 centimeters or more in diameter is used. Of course, there is no limit on the size of hose which may be prepared in accordance to the invention. Typically hose size does not exceed ten centimeters in diameter and one centimeter in wall thickness. The invention is particularly advantageous for making small size hose of four centimeters in diameter or less and wall thickness of one to five millimeters.

Any discontinuous fiber may be used. Fibers which reinforce matrices generally include fibers having an average aspect ratio of 10–3000 and more commonly are fibers having an average aspect ratio of 20–1000. A preferred aspect ratio is 20–350 with an aspect ratio of 50–200 being particularly desirable. Various types of organic and inorganic discontinuous fibers are suitable either in monofilament or stranded form (including bundles of fibers bonded together to make a single element which serves as a single fiber in the sense of orientation and reinforcement). Illustrative examples of satisfactory discontinuous fibers are nylon, rayon, polyester, cotton, wood cellulose, glass, carbon, steel, potassium titanate, boron, alumina and asbestos fibers.

The fiber loading is limited only by the workability of the composite. A workable fiber concentration depends upon fiber aspect ratio, minimum clearance through the die and the viscoelastic properties of the matrix. The amount of fiber dispersed in the matrix is generally between 5–200 parts by weight per 100 parts by weight matrix with amounts of 5–75 parts by weight per 100 parts by weight matrix being especially suitable and 10–40 parts by weight per 100 parts by weight matrix being preferred. The aforesaid fiber loading is calculated by considering all of the other ingredients of the composition (polymer, pigments, antioxidants, bonding agents, etc.) besides the fiber, as being the matrix and is not to be confused with fiber loading expressed in parts by weight per 100 parts by weight polymer which is often done for convenience in formulation. The composite may be comprised entirely of polymer and discontinuous fiber with the polymer being the sole matrix material but generally the polymer comprises only a portion of the matrix because of the presence of other compounding ingredients. Typically, the polymer comprises 10–80 weight percent of the composite but more usually, the polymer comprises about 20 to about 50 weight percent of the composite. The proportions of the fiber will usually fall within the range of 20–150 parts expressed as parts by weight per hundred of polymer. Some synthetic rubber formulations normally contain much higher proportions of other ingredients than natural rubber formulations.

The invention is applicable to any extrudable polymer in which fibers can be dispersed. Any polymer which may be extruded through dies by application of pressure is suitable in the practice of this invention. Thermoplastic polymers are particularly suitable, examples of which are polyvinyl chloride, polyethylene, polypropylene, polyvinyl acetate, polyester polymers, for example, poly(ethylene terephthalate), ABS copolymers, polyamides, for example nylon. A preferred class of extrudable polymers are elastomeric polymers. One class of suitable elastomeric (rubbery) polymer comprises thermoplastic elastomers which do not require vulcanization but are shaped above their softening temperature and develop elastomeric properties upon cooling. Examples of satisfactory thermoplastic elastomers are polyurethane-polyester elastomers (commercially available under the Trademark Texin), segmented polyethers and polyesters (commercially available under the Trademark Hytrel), nylon block polymers and dynamically partially cured blends of polyolefin resin and mono-olefinic rubber, (commercially available under the Trademark TPR). U.S. Pat. Nos. 3,806,558, 3,023,192, 3,651,014, 3,763,109, 3,775,373-5, 3,784,520 and 3,533,172 illustrate suitable thermoplastic elastomers. Vulcanizable elastomers comprise another class of extrudable polymers, especially sulfur-vulcanizable diene elastomers. Either natural or synthetic rubbers or mixtures thereof are satisfactory. Illustrative examples of suitable synthetic rubbers include cis-4-polybutadiene, butyl rubber, neoprene, ethylene proplene terpolymers, polymers of 1,3-butadiene, polymers of isoprene, ethylene vinyl-acetate copolymers and copolymers of 1,3-butadiene with others monomers, for example, styrene, acrylonitrile, isobutylene and methylmethacrylate.

The matrix may, in addition to polymer and fiber, contain other ingredients commonly found therein, and especially those ingredients necessary for achieving the desired properties of the composite composition. Such materials may include, for example, plasticizers, extender oils, antidegradants, reinforcing and non-reinforcing pigments such as zinc oxide, barium oxide, strontium oxide, iron oxide, silica, carbon black and organic pigments, bonding agents, vulcanizing agents such as sulfur, peroxides and vulcanization accelerators. Preferred elastomer compositions are wood cellulose fiber-elastomer composition described in U.S. Pat. No. 3,697,364 and discontinuous mixed fiber-elastomer compositions described in U.S. Pat. No. 3,709,845, both disclosures of which are incorporated herein by reference.

DESCRIPTION OF PREFERRED EMBODIMENTS

To illustrate the invention, a composite comprising cellulose fiber and vulcanizable rubber composition is extruded through dies having constant channel width but having different area expansions to form 1.27 cm D hose having about 4.2 mm wall thickness. The extrudate is cut to provide hoses of any desired length. The uncured hose is vulcanized either in an autoclave or in a mold. When making shaped hose, the hose is bent to the desired shape and vulcanized; preferably vulcanization is carried out in a mold. When the shape of the hose is not too complex, an open one-half mold is all that is necessary to maintain the shape during cure. Shaping of the hose and curing in a mold does not significantly affect fiber orientation.

A composite feed material is prepared by incorporating 65 parts of wood cellulose fiber treated to reduce fiber-to-fiber interaction comprising about 66% fiber with the remainder comprising mainly rubber, lubricant and bonding agent, into the following rubber composition.

|  | Parts by Weight |
| --- | --- |
| EPDM Rubber | 100 |
| FEP carbon black | 122 |
| Extender oil | 85.3 |
| Zinc oxide | 5 |
| Stearic acid | 1 |
| Polymethoxymethylmelamino | 1 |
| Sulfur | 1.5 |
| Dimorpholinodisulfide | 0.8 |
| Tellurium diethyldithiocarbamate | 0.8 |
| Benzothiazyl disulfide | 1.5 |

| -continued | |
| --- | --- |
|  | Parts by Weight |
| Zinc dibutyldithiocarbamate | 2.5 |
| Total | 321.4 |

The composite feed material is extruded using a 8.9 cm vented extruder through dies. The rate of extrusion is about 3 meters per minute with a head pressure in excess of 210 Kg/sq. cm. The die temperature is 100° C. ± about 10° C. All hoses are cured for forty minutes at 160° C. Hose strength is determined by applying steadily increasing hydraulic pressure to a section of hose until burst occurs. The pressure at which the hose ruptures is recorded. Fiber orientation is determined by soaking sections of hose in benzene for 24 hours and measuring the amount of swell. The percent swell is calculated by dividing the original dimension into the change in dimension and multiplying by 100. Axial orientation influences swell in the direction of length, circumferential orientation influences swell in the diameter and radial orientation influences swell in wall thickness. The amount of swell in any principal direction or dimension is inverse to the component of fiber orientation in that direction. (Coran et al, J. Applied Polymer Science, V15, P. 2471-2485, 1971).

The invention includes multilayer hoses in which two or more layers of material are joined to form a single hose having different fiber orientation in each layer. For example, via a cross-head extruder, two hoses are extruded in which one hose envelopes the other to form a single bi-layer hose. By selecting a die of the proper geometry for each layer a hose having radial orientation in the inner layer and axial orientation in the outer layer or vice versa may be prepared. A bi-layer hose in which the inside layer is reinforced with fibers predominately oriented in the circumferential direction and the outer layer is reinforced with fibers predominately oriented in either the radial or the axial directions is especially recommended for high performance applications. By operation of two cross-head extruders in tandem trilayer hoses may be prepared in which predominate fiber orientation may be different in each layer. Alternately, layered hoses may be prepared in a co-extrusion process using a single head fed by multiple extruders.

Although the invention has been illustrated by typical examples, it is not limited thereto. Changes and modifications of the examples of the invention herein chosen for purpose of disclosure can be made which do not constitute departure from the spirit and scope of the invention.

The embodiments of the invention in which an exclusive property of privilege is claimed are defined as follows:

1. A hose having the shape of a hollow cylinder with definite wall thickness and outside diameter and indefinite length, which hose has a smooth surface and is constructed of extrudable polymer reinforced with discontinuous fibers wholly contained therein oriented so that the radial component of fiber orientation exceeds both the circumferential component of orientation and the axial component of orientation whereby the hose will swell, upon exposure to an organic solvent capable of swelling said polymer, in such a manner that the percent increase in its wall thickness is less than the percent increase in its outside diameter as a result of said swelling.

* * * * *